US011456968B2

(12) United States Patent
Jung

(10) Patent No.: US 11,456,968 B2
(45) Date of Patent: Sep. 27, 2022

(54) ETHERNET SWITCH AND METHOD OF CONTROLLING THE SAME

(71) Applicants: Hyundai Motor Company, Seoul (KR); Kia Motors Corporation, Seoul (KR)

(72) Inventor: Hojin Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 387 days.

(21) Appl. No.: 16/682,195

(22) Filed: Nov. 13, 2019

(65) Prior Publication Data

US 2020/0382446 A1 Dec. 3, 2020

(30) Foreign Application Priority Data

Jun. 3, 2019 (KR) .................. 10-2019-0065635

(51) Int. Cl.
*H04L 49/351* (2022.01)
*H04L 12/46* (2006.01)
*H04L 12/40* (2006.01)
*H04L 49/354* (2022.01)

(52) U.S. Cl.
CPC .......... *H04L 49/351* (2013.01); *H04L 12/40* (2013.01); *H04L 12/4683* (2013.01); *H04L 49/354* (2013.01); *H04L 2012/40273* (2013.01)

(58) Field of Classification Search
CPC ... H04L 49/351; H04L 12/40; H04L 12/4683; H04L 49/354; H04L 2012/40273
See application file for complete search history.

(56) References Cited

U.S. PATENT DOCUMENTS

| 10,693,668 | B2 * | 6/2020 | Park | H04L 47/72 |
| 2016/0255154 | A1 * | 9/2016 | Kim | H04L 67/12 726/25 |
| 2020/0410785 | A1 * | 12/2020 | Kawauchi | H04L 12/462 |

FOREIGN PATENT DOCUMENTS

EP 3148236 A1 * 3/2017 ............. H04L 67/12

* cited by examiner

*Primary Examiner* — Kodzovi Acolatse
*Assistant Examiner* — Anindita Sen
(74) *Attorney, Agent, or Firm* — Fox Rothschild LLP

(57) ABSTRACT

An Ethernet switch for a vehicle, a method of controlling the Ethernet switch are provided. The method includes detecting a first connection between a connector of the diagnostic device and a first port of the Ethernet switch and establishing a second connection with the diagnostic device by referring to a virtual local area network identifier (VLAN ID) table. A third connection is established between the controller and an electronic control unit (ECU) of the vehicle by referring to the VLAN ID table. A certificate-based secure access procedure is performed between the diagnostic device and the controller. A mode of the Ethernet switch is switched from a lock mode to an unlock mode and a fourth connection is established between the diagnostic device and the ECU by referring to the VLAN ID table.

16 Claims, 6 Drawing Sheets

| Port Number | Device | VLAN ID |
|---|---|---|
| 1 | DIAGNOSTIC DEVICE (20) | ① |
| 2 | CONTROLLER (200) | ①, ② |
| 3 | ECU 1 (31) | ② |

| Port Number | Device | VLAN ID |
|---|---|---|
| 1 | DIAGNOSTIC DEVICE (20) | ① |
| 2 | CONTROLLER (200) | ①, ② |
| 3 | ECU 1 (31) | ①, ② |

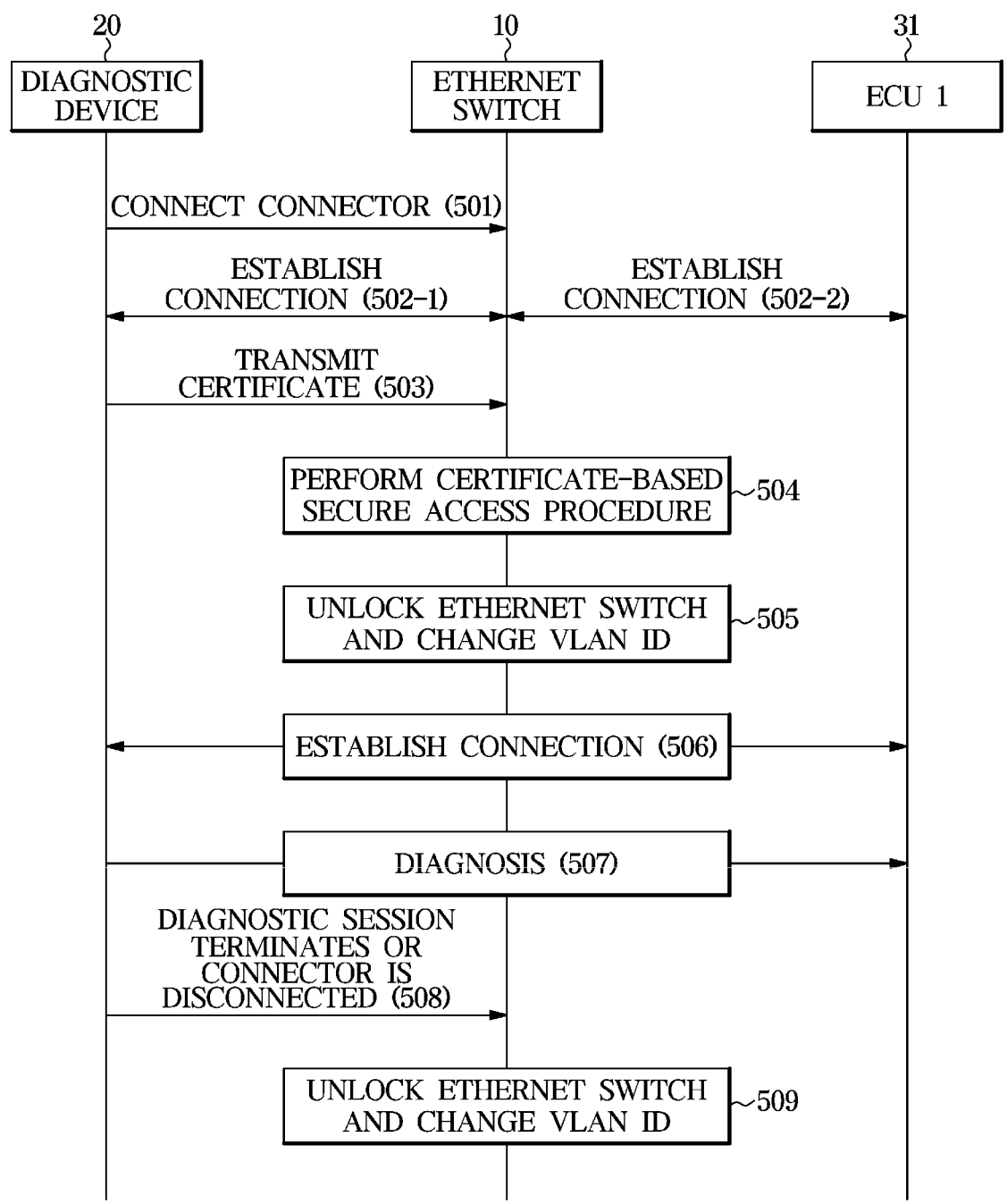

ETHERNET SWITCH AND METHOD OF CONTROLLING THE SAME

This application claims priority to and the benefit of Korean Patent Application No. 10-2019-0065635, filed on Jun. 3, 2019, the disclosure of which is incorporated by reference in its entirety.

BACKGROUND

1. Technical Field of the Disclosure

The disclosure relates to an Ethernet switch provided in a vehicle, a control method thereof, and more particularly, to an Ethernet switch that improves security authentication using an external diagnostic device.

2. Description of the Related Art

With the development of automotive electronics, the number and complexity of controllers provided in a vehicle increases. Due to the corresponding increase in collaboration among the controllers for automotive electronics, the amount of communication data increases, as well. For communication between these controllers, various communication protocols, such as controller area networks with flexible data-rate (CAN-FD) and Ethernet, are employed to manage the data.

The communication protocols handle a substantial amount of data at relatively high speed. Systemwide, data and processing loads are increasing. For instance, a need has arisen to apply the Ethernet to vehicles for rapid controller reprogramming as well as for meeting requirements for image processing. An Ethernet switch is required for Ethernet communication between controllers in a vehicle.

A developed technique transfers Ethernet packets transmitted from an electronic control unit (ECU) directly to another ECU but does not transfer Ethernet packets transmitted from the ECU to another ECU via a micro control unit (MCU) of an Ethernet switch. In other words, when an external device is connected to the Ethernet switch, the external device is able to access the ECU of the vehicle without any limitation. As a result, security of the system is compromised and the system as a whole may be vulnerable.

SUMMARY

The present disclosure provides an Ethernet switch for a vehicle and a control method thereof, which improve security when performing authentication using an external diagnostic device by providing security technology that combines certificate-based secure access control technology with port-based virtual local area network (VLAN) technology.

In accordance with an exemplary embodiment of the present disclosure, a method of controlling an Ethernet switch for a vehicle may include detecting a first connection between a connector of a diagnostic device and a first port of the Ethernet switch; establishing a second connection between the diagnostic device and a controller of the Ethernet switch by referring to a virtual local area network identifier (VLAN ID) table; and establishing a third connection between the controller and an electronic control unit (ECU) in the vehicle by referring to the VLAN ID table. The method may further include performing a certificate-based secure access procedure between the diagnostic device and the controller; and switching a mode of the Ethernet switch from a lock mode to an unlock mode. The method may also include establishing a fourth connection between the diagnostic device and the ECU by referring to the VLAN ID table.

The method may further include, when a diagnostic session of the diagnostic device terminates or the connector of the diagnostic device is disconnected from the first port, switching the mode of the Ethernet switch to the lock mode and releasing the fourth connection between the diagnostic device and the ECU. The establishing of the second connection between the diagnostic device and the controller may include assigning a first VLAN ID to each of the first port to which the diagnostic device is connected and a second port to which the controller is connected The establishing of the third connection between the controller and the ECU may include assigning a second VLAN ID to each of the second port to which the controller is connected and a third port to which the ECU is connected.

Additionally, the establishing of the fourth connection between the diagnostic device and the ECU may include further assigning the first VLAN ID to the third port to which the ECU is connected. The method may further include transmitting an Ethernet packet transmitted from the diagnostic device directly to the ECU after establishing the fourth connection between the diagnostic device and the ECU. The releasing of the fourth connection between the diagnostic device and the ECU may include initializing a VLAN ID assigned to a third port to which the ECU is connected.

The establishing of the second connection between the diagnostic device and the controller may include establishing the second connection between the diagnostic device and the controller using an address resolution protocol (ARP) and a transmission control protocol (TCP). Additionally, the establishing of the fourth connection between the diagnostic device and the ECU may include establishing the fourth connection between the diagnostic device and the ECU using an address resolution protocol (ARP) and a transmission control protocol (TCP).

The performing of the certificate-based secure access procedure may include: receiving a certificate from the diagnostic device; verifying the certificate with a public key of an authentication server previously stored in a memory, and obtaining a public key of the diagnostic device; and transmitting a symmetric key encrypted based on the public key of the diagnostic device to the diagnostic device.

In accordance with an exemplary embodiment of the present disclosure, an Ethernet switch for a vehicle may include: a plurality of ports and a controller including a memory and a processor including a virtual local area network identifier (VLAN ID) table. The controller may be configured to detect a first connection between a connector of the diagnostic device and a first port of the Ethernet switch and establish a second connection with the diagnostic device by referring to the VLAN ID table. The controller may be further configured to establish a third connection between the controller and an electronic control unit (ECU) in the vehicle by referring to the VLAN ID table and perform a certificate-based secure access procedure between the diagnostic device and the controller.

The controller may be configured to switch a mode of the Ethernet switch from a lock mode to an unlock mode, and establish a fourth connection between the diagnostic device and the ECU by referring to the VLAN ID table. When a diagnostic session of the diagnostic device terminates or the connector of the diagnostic device is disconnected from the first port, the controller may be further configured to switch the mode of the Ethernet switch to the lock mode and release the fourth connection between the diagnostic device and the ECU.

The controller may be configured to assign a first VLAN ID to each of the first port to which the diagnostic device is connected and a second port to which the controller is connected. The controller may further be configured to assign a second VLAN ID to each of the second port to which the controller is connected and a third port to which the ECU is connected. Additionally, the controller may be configured to assign the first VLAN ID to the third port to which the ECU is connected. Further, the controller may be configured to initialize the VLAN ID assigned to a third port to which the ECU is connected and establish the second connection with the diagnostic device using an address resolution protocol (ARP) and a transmission control protocol (TCP).

Additionally, the controller may be configured to establish the fourth connection between the diagnostic device and the ECU using an address resolution protocol (ARP) and a transmission control protocol (TCP). Further, the controller may be configured to receive a certificate from the diagnostic device The controller may be configured to verify the certificate with a public key of an authentication server previously stored in a memory and obtain a public key of the diagnostic device. The controller may be configured to transmit a symmetric key encrypted based on the public key of the diagnostic device to the diagnostic device. The memory may further include a media access control (MAC) address table storing MAC addresses respectively corresponding to the plurality of ports.

BRIEF DESCRIPTION OF THE DRAWINGS

These and/or other features of the disclosure will become apparent and more readily appreciated from the following description of the exemplary embodiments, taken in conjunction with the accompanying drawings of which:

FIG. 6 is a flowchart for describing a method of controlling an Ethernet switch according to an exemplary embodiment of the disclosure.

DETAILED DESCRIPTION

Figure 1:
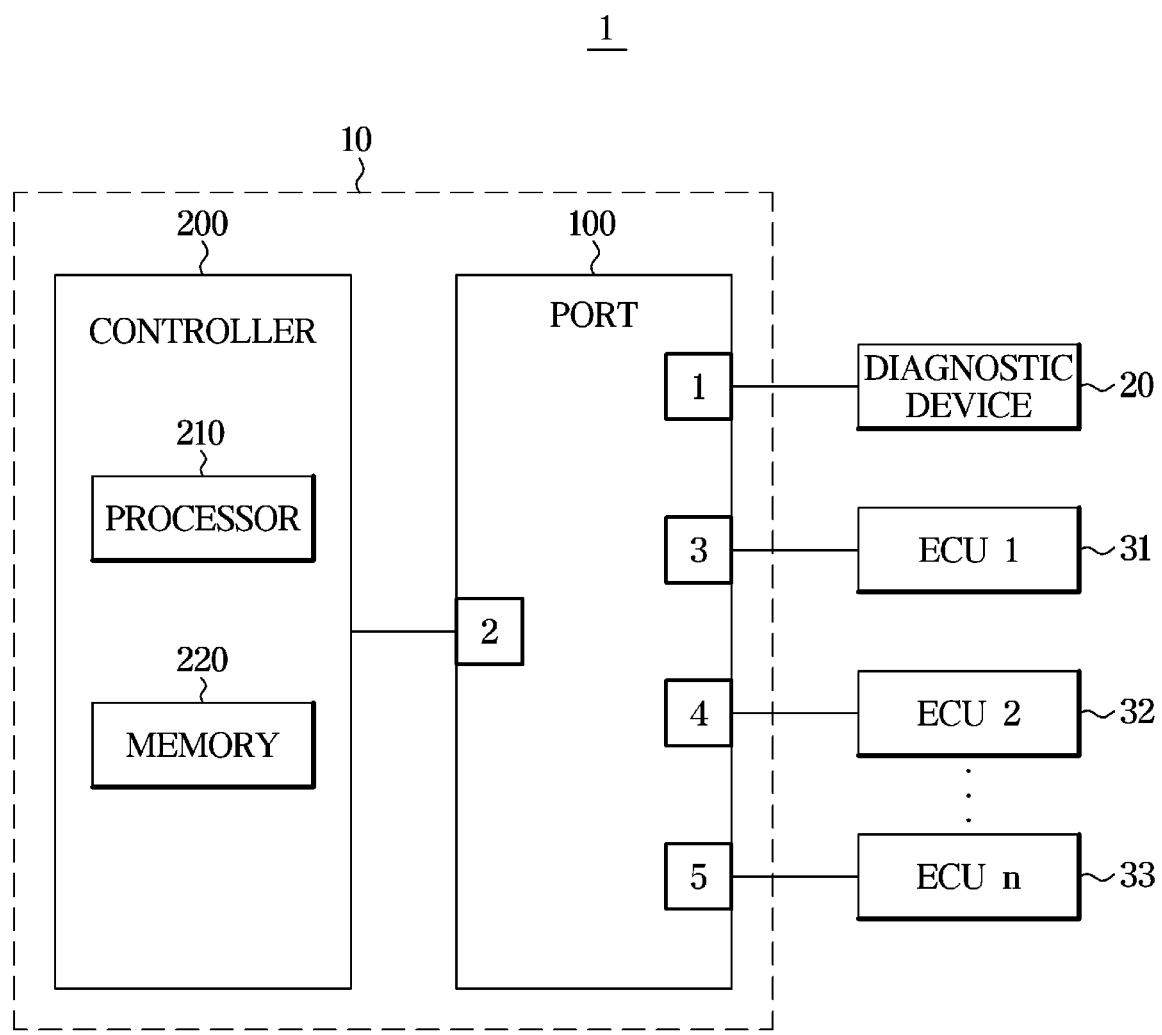
FIG. 1 shows a configuration of an Ethernet switch according to an exemplary embodiment of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

The use of the terms "first" to "fourth", inclusive, herein, are provided to identify the operations, without describing the order of the operations, and the operations may be executed in a different order from the stated order unless a specific order is definitely specified in the context.

Although at least one exemplary embodiment is described as using a plurality of units to perform the exemplary process, it is understood that the exemplary processes may also be performed by one or plurality of modules. Additionally, it is understood that the term controller/control unit may refer to a hardware device that includes a memory and a processor. The memory may be configured to store the modules and the processor may be specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, like reference numerals will refer to like components throughout this specification. This specification does not describe all components of the exemplary embodiments, and general information in the technical field to which the present disclosure belongs or overlapping information between the exemplary embodiments will not be described.

It will be understood that when a component is referred to as being "connected" to another component, it may be directly or indirectly connected to the other component. When a component is indirectly connected to another component, it may be connected to the other component via a wireless communication network. Additionally, it will be understood that when a certain portion "includes" a certain component, the portion does not exclude another component but may further include another component, unless the context clearly dictates otherwise.

In addition, the terms "portion", "device", "block", "member", and "module" used herein refer to a unit for processing at least one function or operation including a unit configured to process at least one function or operation. For example, the terms may mean an electrical circuit, or may mean at least one process that may be processed by at least one hardware or at least one software/processor stored in a memory.

Reference numerals used in operations are provided to identify the operations, without describing the order of the operations, and the operations may be executed in a different order from the stated order unless a specific order is definitely specified in the context.

Hereinafter, exemplary embodiments of the present disclosure will be described in detail with reference to the accompanying drawings.

FIG. 1 shows a configuration of an Ethernet switch for a vehicle according to an exemplary embodiment of the disclosure. Referring to FIG. 1, an Ethernet switch 10 according to an exemplary embodiment of the disclosure may include a plurality of ports 100 and a controller 200. A plurality of devices in a vehicle, for example, a diagnostic device 20 and a plurality of electronic control units (ECUs) 31, 32 and 33 in the vehicle may be connected to the plurality of ports 100. In addition, the controller 200 may also be connected to one of the plurality of ports 100. The diagnostic device 20 and the controller 200 may be configured to communicate with each other via the ports 100. In addition, the diagnostic device 20 and the ECUs 31, 32 and 33 may also be configured to communicate with each other via the ports 100. In FIG. 1, five ports 100 are shown, but the number of the ports 100 is not limited thereto.

The controller 200 may include at least one processor 210 for executing a program related to operations of the Ethernet switch 10, and at least one memory 220 in which the program is stored. The memory 220 and the processor 210 included in the controller 200 may be integrated in one chip, or may be physically separated. The controller 200 may be a micro control unit (MCU).

The memory 220 may include a virtual local area network identifier (VLAN ID) table. In addition, the memory 220 may include a media access control (MAC) address table in which MAC addresses respectively corresponding to the ports 100 are stored. The Ethernet switch 10 may transmit an Ethernet packet to a port to which a device having a destination MAC address is connected, based on the MAC address table in which the MAC addresses and port numbers are recorded.

In addition, the memory 220 may be implemented as a non-volatile memory device (for example, a cache, read only memory (ROM), programmable ROM (PROM), erasable programmable ROM (EPROM), electrically erasable programmable ROM (EEPROM), and flash memory), a volatile memory device (for example, random access memory (RAM)), or a storage medium, such as hard disk drive (HDD) and compact disc read only memory (CD-ROM), to store various programs, data and/or information.

The Ethernet switch 10 may be part of layer 2 of open systems interconnection (OSI) 7 layers. A typical Ethernet switch checks a destination MAC address when sending an Ethernet packet. Thus, in a typical technique, an Ethernet packet transmitted from a diagnostic device corresponding to an external device may be transmitted directly to a plurality of ECUs in a vehicle, not via a controller of an Ethernet switch.

Typically, when a diagnostic device is connected to an Ethernet switch, the diagnostic device is able to access ECUs without any restrictions. In other words, the diagnostic device is able to access the ECUs in the vehicle without authentication by a controller. In particular, security may become vulnerable.

In at least one exemplary embodiment of the disclosure security of the Ethernet switch 10 may be improved by applying certificate-based secure access control technology and port-based VLAN technology to the Ethernet switch 10. The Ethernet switch 10 for a vehicle has been described above, but applications of the Ethernet switch 10 are not limited to the vehicle.

Figure 2:
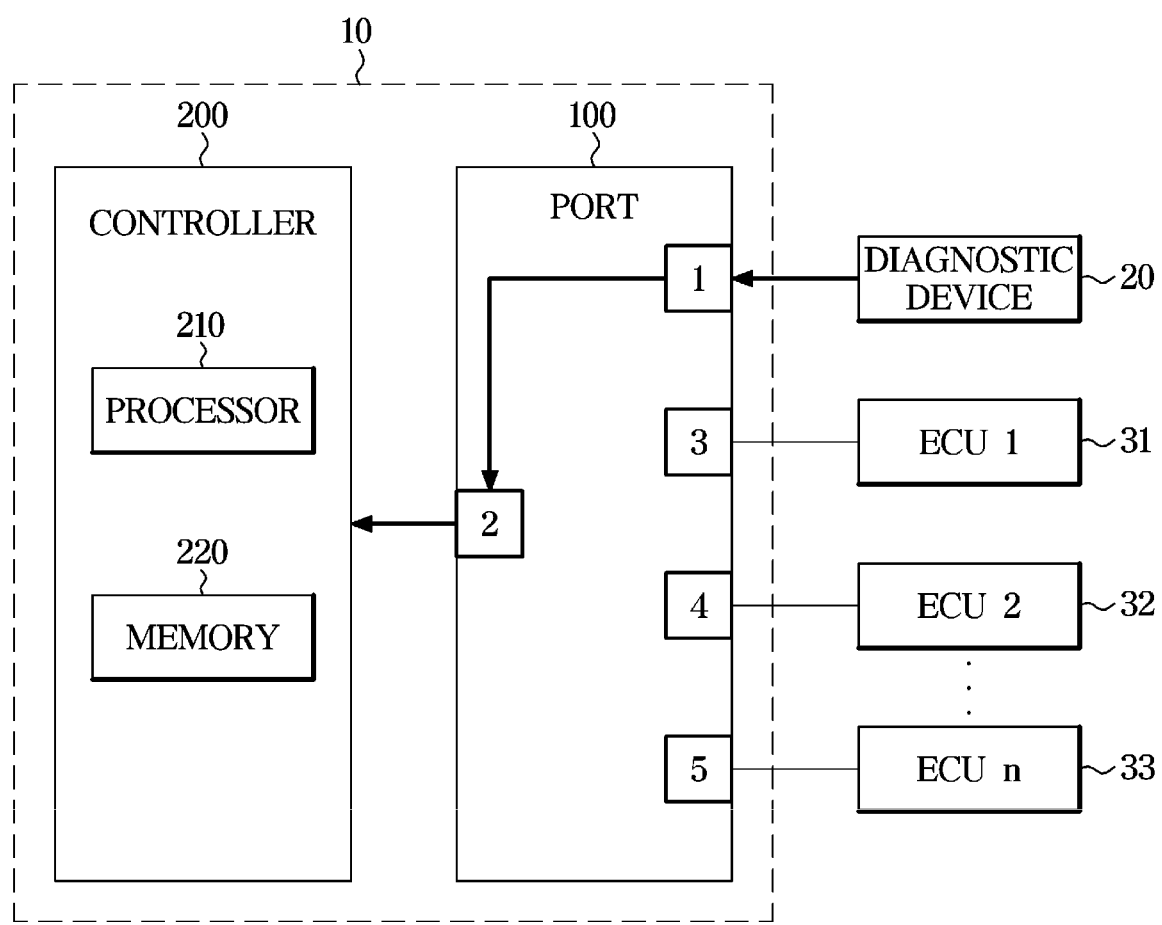
FIG. 2 shows a connection between a controller of an Ethernet switch according to an exemplary embodiment of the disclosure and a diagnostic device.
Figure 3:
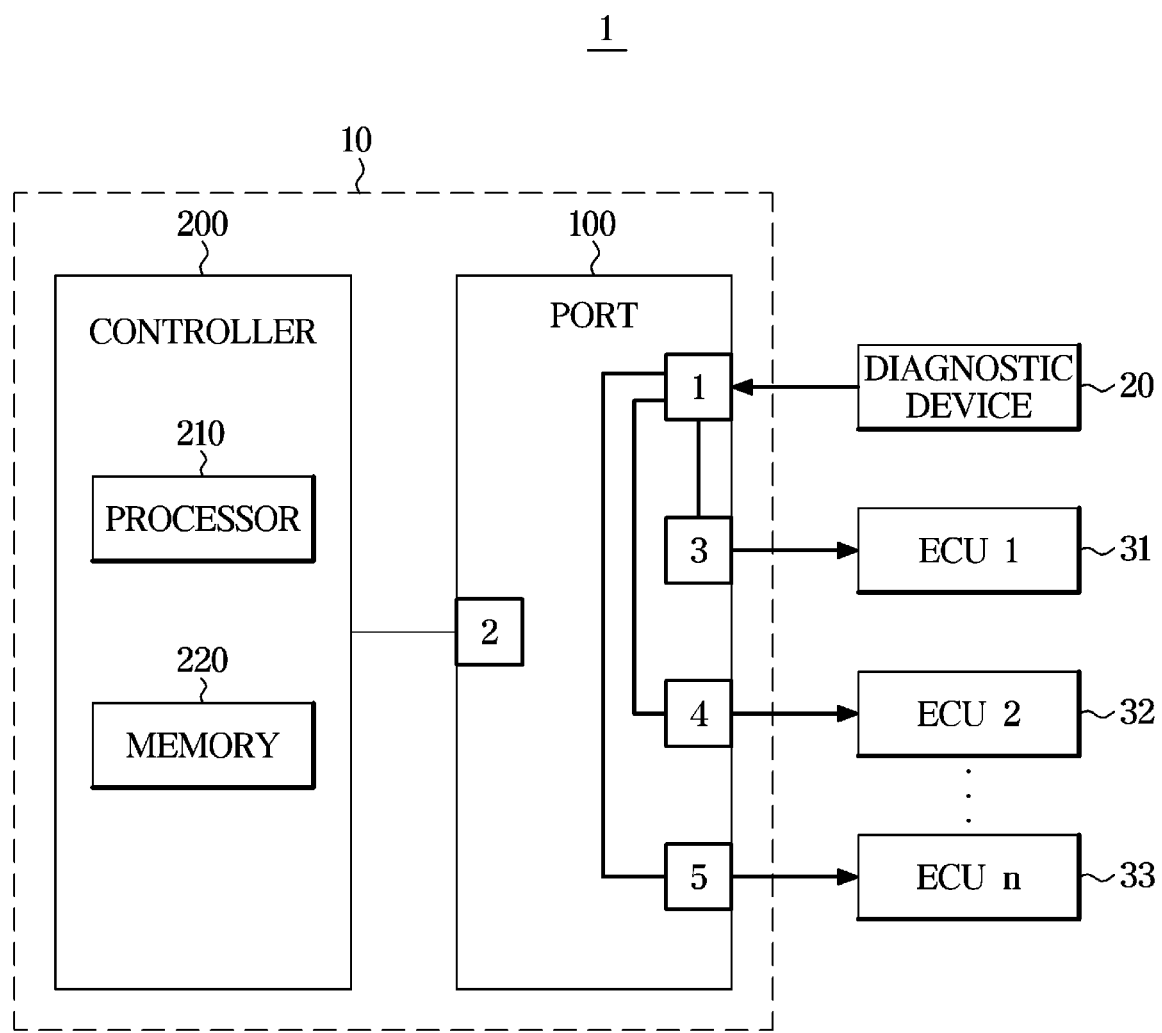
FIG. 3 shows connections between a diagnostic device and electronic control units (ECUs) in a vehicle via an Ethernet switch according to an exemplary embodiment of the disclosure.

Hereinafter, a method of controlling an Ethernet switch according to an exemplary embodiment of the disclosure will be described in detail. For instance, FIG. 2 shows a connection between a controller of an Ethernet switch according to an exemplary embodiment of the disclosure and a diagnostic device, and FIG. 3 shows connections between a diagnostic device and electronic control units (ECUs) in a vehicle via an Ethernet switch according to an exemplary embodiment of the disclosure.

The controller 200 of the Ethernet switch 10 according to an exemplary embodiment of the disclosure may be configured to detect a connection between a connector of the diagnostic device 20 and a first port of the Ethernet switch 10. The controller 200 may be configured to establish a connection with the diagnostic device 20 by referring to the VLAN ID table. Additionally, the controller 200 may be configured to establish connections between the controller 200 and the ECUs 31, 32, and 33 in the vehicle by referring to the VLAN ID table.

The controller 200 may be configured to establish the connection between the diagnostic device 20 and the controller 200 using an address resolution protocol (ARP) and a transmission control protocol (TCP). In addition, the controller 200 may be configured to establish the connections between the diagnostic device 20 and the ECUs 31, 32 and 33 in the vehicle using the ARP and the TCP. The ARP, which is one example of an address determination protocol, is used to bind an internet protocol (IP) address to a physical network address using a network. The physical network address may be a 48-bit network card address of the Ethernet.

The TCP, which is a protocol used by a transport layer among network layers, may be a connection type service for setting up a connection between devices to establish a logical connection between the devices and guaranteeing reliability. The TCP may be configured to establish a connection using a 3-way handshaking process, and release the connection using 4-way handshaking. Connection establishment using the TCP ensures that both sides (e.g., both devices) are ready to transmit data, and provides a ready state notification before data delivery actually begins.

The Ethernet switch 10 may be configured to perform a certificate-based secure access procedure between the diagnostic device 20 and the controller 200. When authentication of the diagnostic device 20 is completed, the controller 200 of the Ethernet switch 10 may be configured to switch a mode of the Ethernet switch 10 from a lock mode to an unlock mode, and establish connections between the diagnostic device 20 and the ECUs 31, 32 and 33 in the vehicle. Thereafter, the diagnostic device 20 may be configured to access the ECUs 31, 32 and 33 in the vehicle.

Before the certificate-based security access procedure is performed, the diagnostic device 20 may be able to access the controller 200 of the Ethernet switch 10. In particular, an on-board diagnostic (OBD) regulatory diagnostic function or an original equipment manufacturer (OEM) generic diagnostic function may be performed. In other words, the lock mode does not necessarily completely disable the device. For example, in an exemplary embodiment, even after the mode of the Ethernet switch 10 is switched into the lock mode, the OBD regulatory diagnostic function or the OEM generic diagnostic function may continue to be performed.

After the certificate-based secure access procedure is performed, the diagnostic device 20 may be configured to access the ECUs 31, 32 and 33 in the vehicle. In particular, all diagnostic functions including the OBD regulatory diagnostic function may be executed. In addition, additional security procedures for the diagnostic functions may be performed by the ECUs 31, 32, and 33.

The certificate-based secure access procedure may include, instead of using a Seed & Key procedure (Challenge & Response Procedure) of combining several bytes, a series of procedures may be executed. For example, the series of procedures may include transmitting a certificate stored in the diagnostic device 20 to the Ethernet switch 10, verifying the certificate with a public key of an authentication server stored in the Ethernet switch 10, obtaining a public key of the diagnostic device 20, and transmitting a symmetric key encrypted by the Ethernet switch 10 based on the public key of the diagnostic device 20 to the diagnostic device 20.

Thereafter, the diagnostic device 20 may be configured to obtain the symmetric key transmitted from the Ethernet switch 10 using a private key of the diagnostic device 20. The Ethernet switch 10 may be configured to exchange ciphertext with the diagnostic device 20 by using the symmetric key. On the other hand, when a diagnostic session of the diagnostic device 20 terminates or a connector of the diagnostic device 20 is disconnected from the first port, the controller 200 may switch the mode of the Ethernet switch 10 to the lock mode and disconnect the connections between the diagnostic device 20 and the ECUs 31, 32 and 33.

Figure 4:
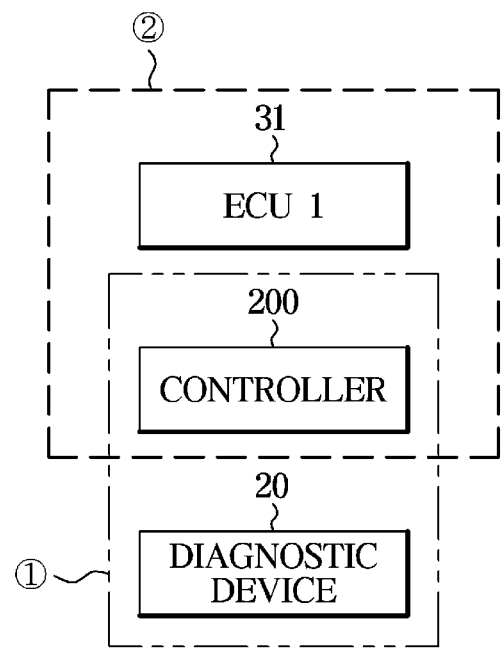
FIG. 4 shows examples of virtual local area network identifiers (VLAN IDs) assigned to individual ports before a certificate-based secure access procedure is performed according to an exemplary embodiment of the disclosure.
Figure 5:
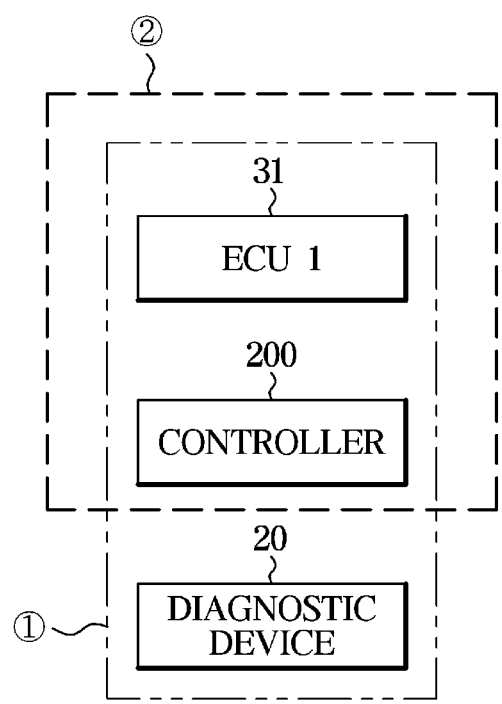
FIG. 5 shows examples of VLAN IDs assigned to individual ports after a certificate-based secure access procedure is performed according to an exemplary embodiment of the disclosure.

FIG. 4 shows examples of VLAN IDs assigned to individual ports before a certificate-based secure access procedure is performed. FIG. 5 shows examples of VLAN IDs assigned to individual ports after a certificate-based secure access procedure is performed.

The controller 200 of the Ethernet switch 10 may be configured to detect a connection between the connector of the diagnostic device 20 and the first port. The controller 200 may be configured to establish a connection between the diagnostic device 20 and the controller 200 by referring to the VLAN ID table, and establish connections with the ECUs 31, 32 and 33 in the vehicle by referring to the VLAN ID table. Specifically, referring to FIG. 4, the controller 200 of the Ethernet switch 10 may be configured to assign a first VLAN ID ① to each of the first port to which the diagnostic device 20 is connected and a second port to which the controller 200 is connected, and assign a second VLAN ID ② to each of the second port to which the controller 200 is connected and a third port to which the ECUs 31, 32 and 33 in the vehicle are connected.

In other words, before the certificate-based security access procedure is performed, the diagnostic device 20 and the ECUs 31, 32 and 33 in the vehicle may have different VLAN IDs, thereby preventing the diagnostic device 20 from accessing the ECUs 31, 32 and 33 in the vehicle. In other words, the controller 200 and the diagnostic device 20 may be grouped based on the first VLAN ID ① and perform communication with each other. The controller 200 and the ECUs 31, 32 and 33 in the vehicle may be grouped based on the second VLAN ID ②, and may be configured to communicate with each other.

Referring to FIG. 5, after the certificate-based security access procedure is performed, the controller 200 may be configured to switch the mode of the Ethernet switch 10 from the lock mode to the unlock mode, and establish connections between the diagnostic device 20 and the ECUs 31, 32 and 33 in the vehicle. The controller 200 may be configured to establish connections between the diagnostic device 20 and the ECUs 31, 32 and 33 in the vehicle by referring to the VLAN ID table.

In particular, the controller 200 may be configured to further assign the first VLAN ID ① to the third port to which the ECUs 31, 32 and 33 in the vehicle are connected. Accordingly, the diagnostic device 20 and the ECUs 31, 32 and 33 in the vehicle may be grouped based on the same first VLAN ID ①. In other words, the first VLAN ID ① assigned to each of the first port to which the diagnostic device 20 is connected and the second port to which the controller 200 is connected may automatically extend to the third port to which the ECUs 31, 32 and 33 in the vehicle are connected.

Thereafter, the diagnostic device 20 may be configured to access and communicate with the ECUs 31, 32 and 33 in the vehicle. For example, Ethernet packets transmitted from the diagnostic device 20 may be transmitted directly to the ECUs 31, 32 and 33 in the vehicle via the ports 100 of the Ethernet switch 10.

When a diagnostic session of the diagnostic device 20 terminates or the connector of the diagnostic device 20 is disconnected from the first port, the controller 200 may be configured to switch the mode of the Ethernet switch 10 to the lock mode and disconnect the connections between the diagnostic device 20 and the ECUs 31, 32 and 33 in the vehicle. In particular, the controller 200 may be configured to initialize the VLAN ID assigned to the third port to which the ECUs 31, 32 and 33 in the vehicle are connected. In other words, the first VLAN ID ① assigned to the third port to which the ECUs 31, 32 and 33 in the vehicle are connected may be deleted, the diagnostic device 20 and the ECUs 31, 32 and 33 in the vehicle may be ungrouped, and the diagnostic device 20 may be prevented from accessing the ECUs 31, 32 and 33 in the vehicle.

FIG. 6 is a flowchart for describing a method of controlling an Ethernet switch according to an exemplary embodiment of the disclosure. Referring to FIG. 6, the controller 200 of the Ethernet switch 10 may be configured to detect a connection between the connector of the diagnostic device 20 and the first port, in operation 501. The controller 200 may be configured to establish a connection between the diagnostic device 20 and the controller 200 by referring to the VLAN ID table, in operation 502-1, and establish connections between the controller 200 and the ECUs 31, 32 and 33 in the vehicle by referring to the VLAN ID table, in operation 502-2. Thereafter, the controller 200 of the Ethernet switch 10 may be configured to receive a certificate from the diagnostic device 20, in operation 503. The Ethernet switch 10 may be configured to perform a certificate-based secure access procedure between the diagnostic device 20 and the controller 200, in operation 504.

When authentication of the diagnostic device 20 is completed, the controller 200 of the Ethernet switch 10 may be configured to switch the mode of the Ethernet switch 10 from a lock mode to an unlock mode, and change a VLAN ID of the third port to which the ECUs 31, 32 and 33 in the vehicle are connected by further assigning the first VLAN ID ① to the third port to which the ECUs 31, 32 and 33 in the vehicle are connected, in operation 505.

The controller 200 may be configured to establish connections between the diagnostic device 20 and the ECUs 31, 32 and 33 in the vehicle, in operation 506. Then, the diagnostic device 20 may be configured to access the ECUs 31, 32 and 33 in the vehicle to perform a diagnostic function, in operation 507. The controller 200 may be configured to determine that a diagnostic session of the diagnostic device 20 terminates or that the connector of the diagnostic device 20 is disconnected from the first port.

When the diagnostic session of diagnostic device 20 terminates or the connector of diagnostic device 20 is disconnected from the first port, the controller 200 may be configured to switch the mode of the Ethernet switch 10 to the lock mode, and change the VLAN ID of the third port to which the ECUs 31, 32 and 33 in the vehicle are connected, in operations 508 and 509. The controller 200 may be configured to release the connections between the diagnostic device 20 and the ECUs 31, 32 and 33 in the vehicle by initializing the VLAN ID assigned to the third port to which the ECUs 31, 32 and 33 in the vehicle are connected. Accordingly, the diagnostic device 20 may be prevented from accessing the ECUs 31, 32 and 33 in the vehicle.

As described above, the Ethernet switch for the vehicle and the method of controlling the same may improve security when performing authentication using an external device by providing security technology that combines certificate-based security access technology with port-based VLAN technology of Ethernet switch.

In addition, the Ethernet switch for the vehicle and the method of controlling the same may operate an external device to access the ECUs in the vehicle without any additional hardware. Further, the Ethernet switch for a vehicle and the method of controlling the same may automatically allow or disallow an external device to access the ECUs in the vehicle. By employing the method, Ethernet switch security may be improved and may be less vulnerable.

The disclosed exemplary embodiments may be implemented in the form of a recording medium storing programs and/or instructions that are executable by a computer. The instructions may be stored in the form of a program code, and when executed by a processor, the instructions may generate a program module to perform operations of the disclosed exemplary embodiments. The recording medium may be implemented as a non-transitory computer-readable recording medium. The non-transitory computer-readable recording medium may include all kinds of recording media storing instructions that may be interpreted by a computer. For example, the non-transitory computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A method of controlling an Ethernet switch for a vehicle, comprising:
   detecting, by a controller, a first connection between a connector of a diagnostic device and a first port of the Ethernet switch;
   establishing, by the controller, a second connection with the diagnostic device by referring to a virtual local area network identifier (VLAN ID) table, and assigning a first VLAN ID to each of the first port to which the diagnostic device is connected and a second port to which the controller is connected;
   establishing, by the controller, a third connection between the controller and an electronic control unit (ECU) in the vehicle by referring to the VLAN ID table, and assigning a second VLAN ID to each of the second port to which the controller is connected and a third port to which the ECU is connected;
   performing, by the controller, a certificate-based secure access procedure between the diagnostic device and the controller;
   switching, by the controller, a mode of the Ethernet switch from a lock mode to an unlock mode after performing the certificate-based security access procedure; and
   establishing, by the controller, a fourth connection between the diagnostic device and the ECU by referring to the VLAN ID table, and assigning the first VLAN ID to the third port to which the ECU is connected after the mode of the Ethernet switch is switched to the unlock mode.

2. The method according to claim 1, further comprising:
   when a diagnostic session of the diagnostic device terminates or the connector of the diagnostic device is disconnected from the first port, switching, by the controller, the mode of the Ethernet switch to the lock mode and releasing the fourth connection between the diagnostic device and the ECU.

3. The method according to claim 2, wherein the releasing of the fourth connection between the diagnostic device and the ECU includes initializing a VLAN ID assigned to a third port to which the ECU is connected.

4. The method according to claim 1, further comprising:
   transmitting, by the controller, an Ethernet packet transmitted from the diagnostic device directly to the ECU after establishing the fourth connection between the diagnostic device and the ECU.

5. The method according to claim 1, wherein the establishing of the second connection between the diagnostic device and the controller includes establishing the second connection between the diagnostic device and the controller using an address resolution protocol (ARP) and a transmission control protocol (TCP).

6. The method according to claim 1, wherein the establishing of the fourth connection between the diagnostic device and the ECU includes establishing the fourth connection between the diagnostic device and the ECU by using an address resolution protocol (ARP) and a transmission control protocol (TCP).

7. The method according to claim 1, wherein the performing of the certificate-based secure access procedure includes:
   receiving, by the controller, a certificate from the diagnostic device;
   verifying, by the controller, the certificate with a public key of an authentication server previously stored in a memory, and obtaining a public key of the diagnostic device; and
   transmitting, by the controller, a symmetric key encrypted based on the public key of the diagnostic device to the diagnostic device.

8. An Ethernet switch for a vehicle, comprising:
   a plurality of ports; and
   a controller including a memory and a processor having a virtual local area network identifier (VLAN ID) table, wherein the controller is configured to:
   detect a first connection between a connector of the diagnostic device and a first port of the Ethernet switch;
   establish a second connection with the diagnostic device by referring to the VLAN ID table, and assign a first VLAN ID to each of the first port to which the diagnostic device is connected and a second port to which the controller is connected;

establish a third connection between the controller and an electronic control unit (ECU) in the vehicle by referring to the VLAN ID table, and assign a second VLAN ID to each of the second port to which the controller is connected and a third port to which the ECU is connected;

perform a certificate-based secure access procedure between the diagnostic device and the controller;

switch a mode of the Ethernet switch from a lock mode to an unlock mode;

establish a fourth connection between the diagnostic device and the ECU by referring to the VLAN ID table, and assign the first VLAN ID to the third port to which the ECU is connected after the mode of the Ethernet switch is switched to the unlock mode.

9. The Ethernet switch according to claim 8, wherein, when a diagnostic session of the diagnostic device terminates or the connector of the diagnostic device is disconnected from the first port, the controller is configured to switch the mode of the Ethernet switch to the lock mode and release the fourth connection between the diagnostic device and the ECU.

10. The Ethernet switch according to claim 9, wherein the controller is configured to initialize a VLAN ID assigned to a third port to which the ECU is connected.

11. The Ethernet switch according to claim 8, wherein the controller is configured to establish the second connection between the diagnostic device and the controller using an address resolution protocol (ARP) and a transmission control protocol (TCP).

12. The Ethernet switch according to claim 8, wherein the controller is configured to establish the fourth connection between the diagnostic device and the ECU using an address resolution protocol (ARP) and a transmission control protocol (TCP).

13. The Ethernet switch according to claim 8, wherein the controller is configured to:

receive a certificate from the diagnostic device;

verify the certificate with a public key of an authentication server previously stored in a memory;

obtain a public key of the diagnostic device, and transmit a symmetric key encrypted based on the public key of the diagnostic device to the diagnostic device.

14. The Ethernet switch according to claim 8, wherein the memory includes a media access control (MAC) address table storing MAC addresses respectively corresponding to the plurality of ports.

15. A non-transitory computer-readable recording medium containing program instructions executed by a processor, the program instructions when executed configured to:

detect a first connection between a connector of a diagnostic device and a first port of the Ethernet switch;

establish a second connection with the diagnostic device by referring to a virtual local area network identifier (VLAN ID) table, and assign a first VLAN ID to each of the first port to which the diagnostic device is connected and a second port to which the controller is connected;

establish a third connection between the controller and an electronic control unit (ECU) in the vehicle by referring to the VLAN ID table, and assign a second VLAN ID to each of the second port to which the controller is connected and a third port to which the ECU is connected;

perform a certificate-based secure access procedure between the diagnostic device and the controller;

switch a mode of the Ethernet switch from a lock mode to an unlock mode; and establish a fourth connection between the diagnostic device and the ECU by referring to the VLAN ID table, and assign the first VLAN ID to the third port to which the ECU is connected after the mode of the Ethernet switch is switched to the unlock mode.

16. The non-transitory computer-readable recording medium according to claim 15, the program instructions when executed further configured to:

when a diagnostic session of the diagnostic device terminates or the connector of the diagnostic device is disconnected from the first port, switch the mode of the Ethernet switch to the lock mode and release the fourth connection between the diagnostic device and the ECU.

* * * * *